Feb. 27, 1951  C. B. WATTS, JR., ET AL  2,543,081
PULSED LOCALIZER
Filed March 16, 1948  4 Sheets-Sheet 1

INVENTORS
CHESTER B. WATTS, JR.
GUS STAVIS
BY
R P Morris
ATTORNEY

Feb. 27, 1951   C. B. WATTS, JR., ET AL   2,543,081
PULSED LOCALIZER
Filed March 16, 1948   4 Sheets-Sheet 2
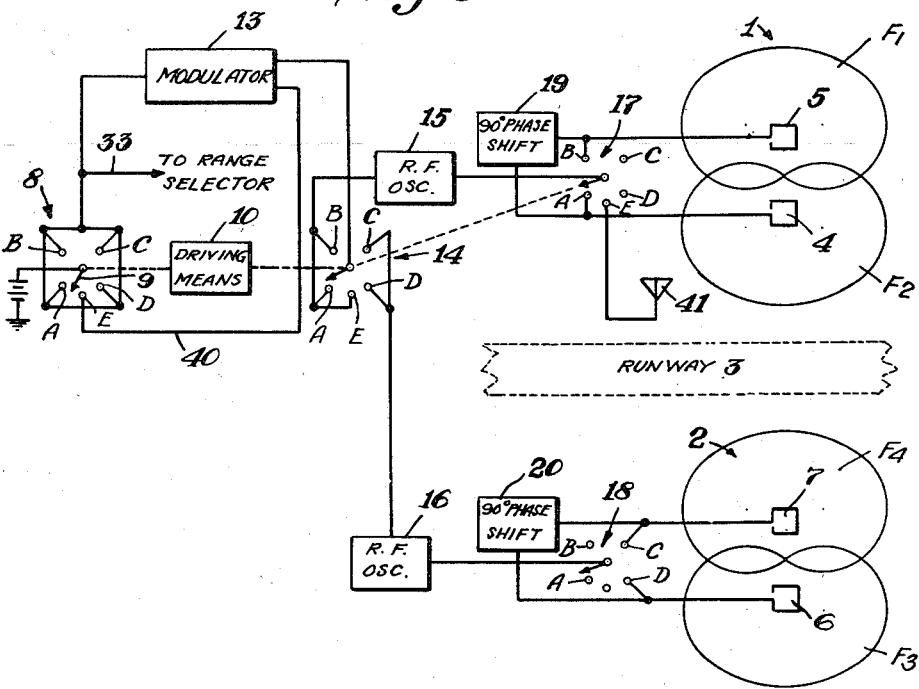
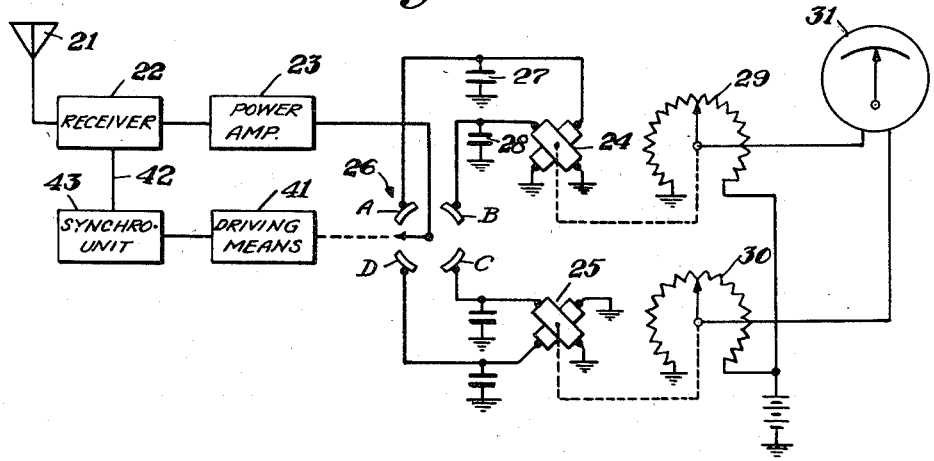
INVENTORS
CHESTER B. WATTS, JR.
GUS STAVIS
BY
*R. P. Morris*
ATTORNEY

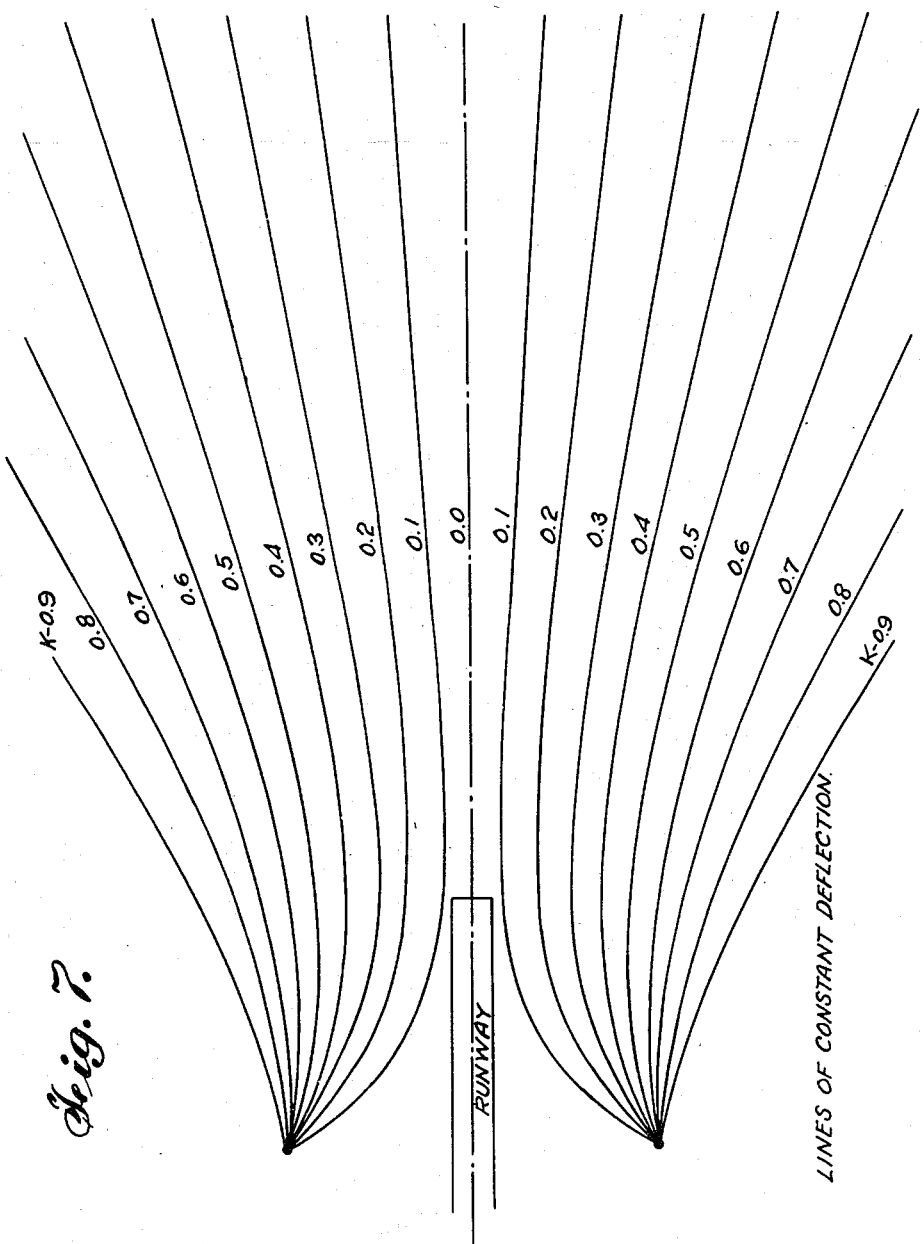

Patented Feb. 27, 1951

2,543,081

UNITED STATES PATENT OFFICE 2,543,081

PULSED LOCALIZER

Chester B. Watts, Jr., Indianapolis, Ind., and Gus Stavis, Ossining, N. Y., assignors to International Standard Electric Corporation, New York, N. Y., a corporation of Delaware Application March 16, 1948, Serial No. 15,158

8 Claims. (Cl. 343—16)

1

This invention relates to aerial navigation systems, and more particularly to an arrangement permitting the guidance of a mobile craft to a landing along an electromagnetically defined energy reference zone or line, utilizing lobe-switching ground radar principles.

Radiant energy system for guiding mobile craft with respect to a prescribed course are well known. In locations wherein considerable aircraft traffic is experienced as in connection with the landing of aircraft on the runway it is desirable that the information given to the craft to enable it to make an instrument landing be reproduced on the ground for purposes of monitoring, traffic control and for emergency talk-down procedure. Where the aircraft may be equipped with other than communications equipment, as for example, a cross-pointer type of indicator for obtaining course indications, it is desirable to provide a system sufficient for either equipped or unequipped aircraft.

An object of this invention is to provide a radio navigation system utilizing radiant energy pulse transmissions from antennas spaced on opposite sides of a prescribed course, each of said antennas providing overlapping directive radiations of different characteristics.

In accordance with an embodiment of my invention, a localizer system for guiding an aircraft to a landing on a prescribed runway comprises a ground transmitter and receiver. The ground transmitter comprises two radiator arrays mounted on opposite sides of the runway in the vicinity of the point of contact of the aircraft upon landing.

The transmitter arrays are energized with pulse energy whereby four differently directed radiation patterns are provided consecutively. The energy of the consecutive pulses, after reflection from the aircraft, is received in the ground receiver in a prescribed manner to provide the desired bearing indication. Where a suitable receiving arrangement is also provided on the landing aircraft, it is synchronized with the ground equipment by means of synchronizing pulses transmitted from the ground transmitter and operates consecutively to apply the received pulse energy to an energy comparing unit in synchronism with the consecutive pulse transmissions.

The above mentioned and other features and objects of the invention will become more apparent, and the invention itself, though not necessarily defined by said features and objects, will be clearly understood by reference to the following description of an embodiment of the invention taken in connection with the accompanying drawings wherein:

Figs. 3 and 4 show in block diagram form modifications of the equipment of Figs. 1 and 2 in order to permit the operation of a receiver arrangement similar to Fig. 2 in the landing aircraft;

Fig. 7 shows a set of curves used in explaining the operation of the indictor of the receiving arrangement of Fig. 2.

Figure 1:
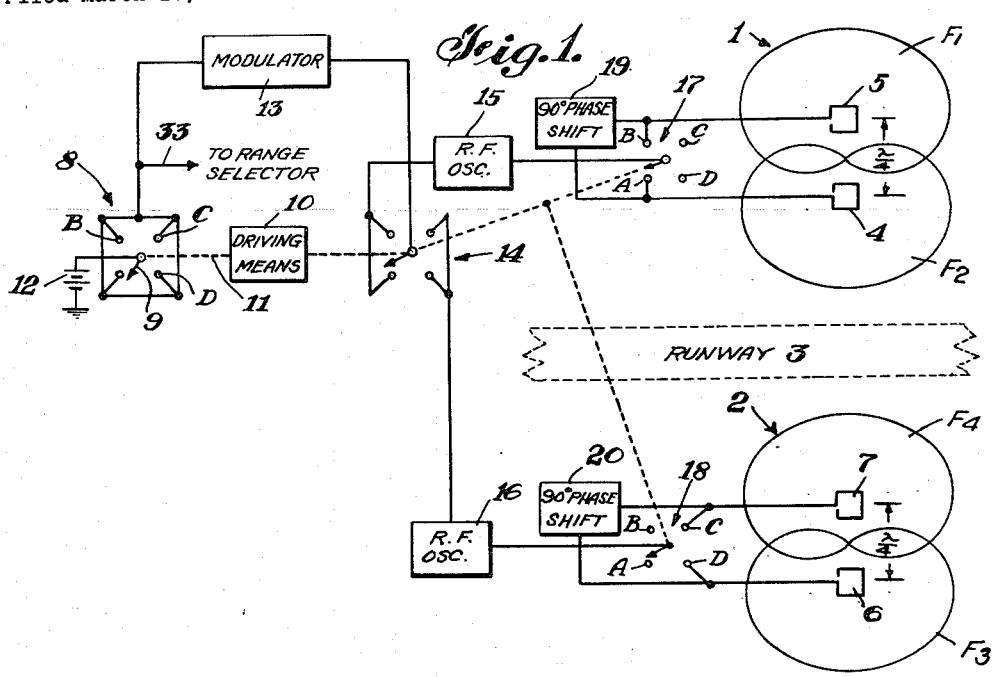
Fig. 1 shows in block diagram form a transmitter arrangement in accordance with the invention.

Referring to Fig. 1 the localizer course is defined by the comparison of four radiant energy patterns designated as F1, F2, F3, F4. These patterns are provided by two antenna systems 1 and 2 mounted one on each side of the runway 3 in the vicinity of the point of contact of aircraft upon landing. Each of the systems provide two different radiation patterns, each preferably directive in the direction of approach of landing aircraft. The corresponding patterns on opposite sides of the runway are made identical, as for example, F1 and F4 being identical and F2 and F3 being identical. If the antenna patterns are pulsed, that is, if F1 is produced for 1 microsecond, then F2, F3, and F4 in rotation, it is possible to receive echoes of these transmitted pulses after reflection from an aircraft at a ground receiver, from which sufficient information may be obtained to talk a non-equipped airplane into landing position. In order to provide the above mentioned features each radiator array may comprise two radiator elements, as for example, two loop aerials mounted in a horizontal plane. Elements 4 and 5 for array 1 and elements 6 and 7 for array 2. As shown in Fig. 1 the elements of each array are spaced apart a quarter wavelength at the carrier frequency. Thus by energizing element 4 with energy of a given phase and element 5 with energy of a phase differing by 90°, the pattern F1 is produced. Then by applying energy of said given phase to element 5 and simultaneously to element 4 with a phase difference of 90°, the pattern F2 is produced which is a mirror image of F1. By sequentially providing the phase variations of 90° in the carrier energy supplied to each of the elements 4 and 5, a lobe-switching is effected. A similar arrangement is provided for the array 2. While the arrays described provide cardioid type patterns having their maxima of radiation substantially in the direction of an approaching aircraft for landing or for an airplane on take off, other types of patterns may be utilized which provide a directive radiation pattern in a desired direction, the radiation patterns of a pair on one side of the course being different in the desired direction, and it merely being necessary to duplicate this pair of radiation patterns on the other side of the runway.

A preferred arrangement for a ground transmitter in accordance with the invention comprises a keying unit 8 with switch blade 9 controlled by a driving means 10 to provide consecutive keying pulses for the radiation patterns F1, F2, F3 and F4 consecutively. The keying unit 8 may comprise a rotating switch blade 9 synchronized with the driving means 10 through element 11 which consecutively engages switch contacts A, B, C, and D to apply a keying voltage from source 12 to the modulator unit 13. The keying pulses from modulator 13 comprise the keying pulses for antennas F1, F2, F3 and F4 corresponding to the energization of switching contacts A, B, C, and D. The output of modulator 13 is applied through a rotating switch 14 similar in operation to the keying unit 8 for switching the keying pulses in sequence to energize the radio frequency oscillators 15 and 16 which are shown to be operating on the same frequency although different frequencies may be employed. Oscillators 15 and 16 may be mounted on opposite sides of the runway 3. The output of the radio frequency oscillator 15 is used to energize elements of array 1 while the output of the radio frequency oscillator 16 is utilized to energize array 2. Separate switching units 17 and 18 are provided for applying properly phased radio frequency energy sequentially to elements 4, 5 and 6, 7 respectively. The elements 8, 14, 17 and 18 are arranged, as on a common shaft, to be driven synchronously by the driving means 10. Thus the transmitter switching unit 17 applies energy from oscillator 15 to element 4 in a given phase and to element 5 through a phasing unit, as for example the 90° phase delay unit 24, to element 5. This provides the radiation pattern F1. In position B carrier energy is applied to element 4 through the 90° phase delay unit 19 and to element 5 at the given phase to provide the radiation pattern F2. In position C carrier energy is applied to element 7 in given phase and to element 6 through the phase delay unit 20 to provide the radiation pattern 3. In position D carrier energy is applied to element 6 in given phase and to element 7 through the phase delay unit 20 to provide the radiation pattern F4. Synchronized switching in Fig. 1 is indicated by rotating switches which are understood to be on the same shaft. This is done only to simplify the diagram since it is obvious that electronic switching is better suited to this task. Thus the pulses are delivered sequentially to the radiators, one on each side of the runway. The outputs of these radiators are sequentially switched to provide the radiation patterns F1, F2, F3 and F4 in that order.

Figure 2:
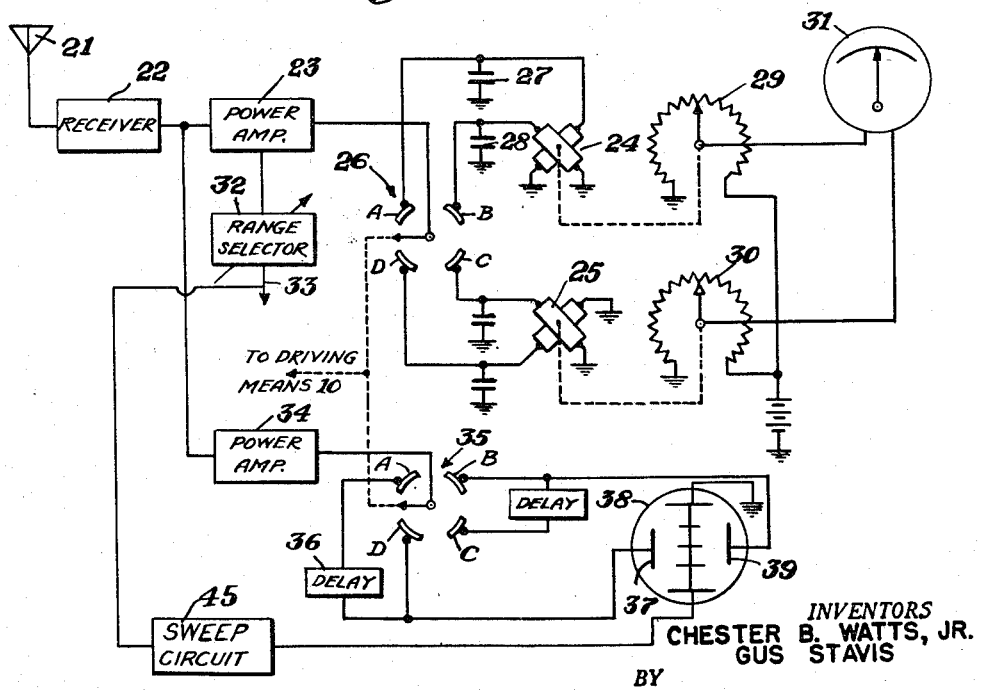
Fig. 2 shows in block diagram form a ground receiver arrangement in accordance with the invention.

A receiver for the ground equipment is shown in Fig. 2. The ground receiver antenna 21 receives the transmitted pulse energy after reflection from an aircraft, which is thereupon applied to the receiver proper 22 which may comprise a local oscillator, mixer, and intermediate frequency amplifier unit. Receiver 22 is supplied with keying pulses from the transmitter keying unit 8 over line 33 to disable the receiver during transmitting periods as shown. The output of this portion of the receiver consists of the received pulse echoes. This output is passed into a power amplifier tube 23 where it is amplified to a level sufficient to operate a pulse energy intensity comparison indicators, as for example the two ratiometers 24 and 25. These ratiometers consist of two coils mounted on the same frame at right angles to one another which are free to rotate in a uniform magnetic field. Echoes due to F1 are fed to one coil, and echoes due to F2 to the other by means of the rotating switch 26. This switch is on the same shaft as the transmitter switches of Fig. 1 for reasons of synchronization. Thus in position A of switch 26, echo energy due to F1 is applied through the storage condenser 27 to one coil of the ratiometer 24, while in position B, echo energy due to F2 is applied through the storage condenser 28 to the other coil of the ratiometer 24. Storage condensers 27 and 28 are of sufficient value to retain their respective charges for a sufficient period to maintain substantially steady and smooth operation of the coils of ratiometer 24. Thus the coils of the ratiometer 24 rotate through angles whose tangents are proportional to the ratio F1 to F2. Similar operation is provided for the ratiometer 25 and F3 to F4. The ratiometers 24 and 25 are coupled mechanically to sensitive potentiometers 29 and 30 which provide a direct voltage proportional to the rotation angle. A zero center meter 31 connected as shown, measures the difference in potential across the two arms of potentiometers 29 and 30. Since each of the potentiometer arms is at a potential proportional to $$\tan^{-1}\left(\frac{F1}{F2}\right) \text{ and } \tan^{-1}\left(\frac{F3}{F4}\right)$$

respectively, the meter will read a value equal to $$\tan^{-1}\left(\frac{F1}{F2}\right) - \tan^{-1}\left(\frac{F3}{F4}\right)$$

which determines the course position of the approaching aircraft.

Assuming that the arrays which produce the individual patterns F1, F2, F3, and F4 each consist of two omni-directional elements spaced ¼ wavelength apart and 90° out of phase the equations for F1, F2, F3 and F4 may be shown to be:

$$F2 = F3 = 2A \cos\left(\frac{d}{2}\sin\theta \pm \frac{\phi}{2}\right)$$
$$= 2A \cos(45° \sin\theta + 45°) \quad (1)$$

and $$F1 = F4 = 2A \cos\left(\frac{d}{2}\sin-\theta + \frac{\phi}{2}\right)$$
$$= 2A \cos(45° \sin-\theta + 45°) \quad (2)$$

Figure 5:
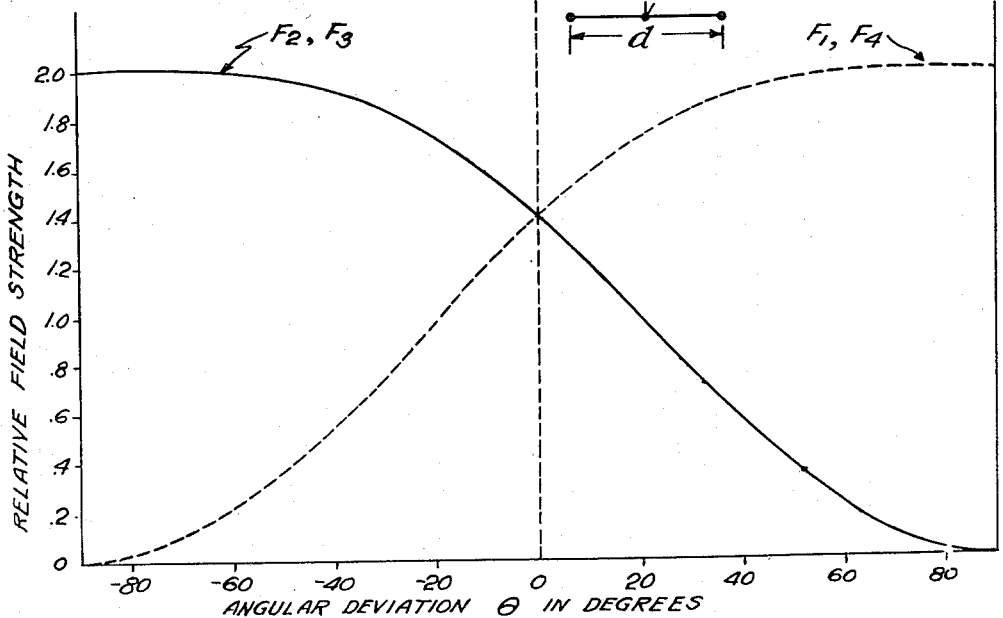
Fig. 5 shows a set of curves used in explaining the operation of the invention.
Figure 6:
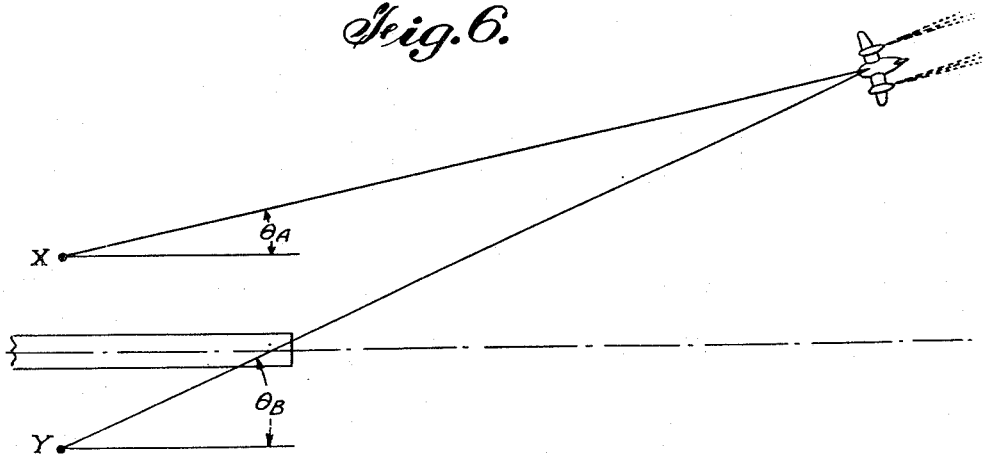
Fig. 6 shows in schematic form certain principles of applicant's invention.

The curves of these equations are shown in Fig. 5 wherein $\theta$ is the angular deviation from the center line passing between the two elements of an antenna array located on one side of the runway and A is a constant. The localizer courses are given by either the function $F1-F2$ equals $F3-F4$, or $F1:F2$ equals $F3:F4$. Assuming a meter deflection proportional to $F1-F2$ minus $F3-F4$, the course position of the approaching aircraft may be shown to be:

$$K = 2 \sin(45 \sin \theta X) \text{ plus } 2 \sin(45 \sin \theta Y)$$

where according to Fig. 6 the angle from radiator X on one side of the runway to the airplane is $\theta X$ and the angle from radiator Y on the other side of the runway to the airplane is $\theta Y$. This latter equation is shown plotted in Fig. 7 wherein the meter deflecion for various angles of approach with respect to the runway are shown.

If two airplanes are sending echoes back, it may be desirable to eliminate echoes from one. This is possible if the planes are at different distances from the airport so that a range selector or delay gate may be used to permit the power amplifier to select only targets at any one range. Such a range selector 32 is shown which is fed keying pulses by means of connection 33 from the transmitter keying unit. The output of 32 is fed to the power amplifier 23. Range selector 32 may consist of a gating multi-vibrator which unblanks the power amplifier for a time interval of approximately 1½ times the received pulse width. The unblanking will occur at any time up to one repetition period after the transmitted pulse, the time being controlled by a variable delay circuit contained within the range selector 32.

To permit overall inspection of the approach region an "L" scope presentation may be provided. Signals from the receiver 22 are amplified in a second power amplifier 34 and passed to a rotating switch unit 35 which is coupled to the same shaft as the transmitter switches. Pulses from F1 are passed through delay unit 36 to deflection plate 37 of the oscilloscope tube 30. Delay unit 36 provides a delay equal to one switching interval, such as between positions A and B. Pulses from F2 are directly imposed on the other deflection plate 39. Thus echoes from F2 and F1 are subtracted directly in the oscilloscope tube. Similar operation is obtained for F3 and F4. A sweep circuit 45 fed with keying signals over line 33 provides a sweep voltage for every second keying pulse. Thus, for each target, there are two pulses shown one on each side of the range sweep line, one of which is equal to $F3-F4$. The larger of these difference pulses becomes the direction of deviation from course of the approaching aircraft.

At great distances from the airport and in line with the runway, the differences $F1-F2$ and $F3-F4$ approach zero and the magnitude of the pips on the oscilloscope will be very small. This undesirable effect may be overcome by arranging the antennas so that the patterns toe out by a small angle. By doing this, the airplane will always be visible on the oscilloscope regardless of position within the radar range.

As mentioned previously for the sake of providing a simple illustration of the principles involved, the patterns chosen are shown to be cardioides. These are not necessarily the best patterns to use if sharpness of course is desired. In this system the sharpness of the course is a function of the beam sharpness of the radiated patterns. Sharp antenna patterns are desirable to secure course sharpness, to minimize reflection from hangars and other obstacles close to the equipment, and to increase the radar range by directing the energy in the approach direction.

Thus in the case of airplanes equipped with only communication gear, the ground operator may talk the pilot down to a lower approach position with the aid of a transmitting and receiving arrangement substantially as described.

The present system may in some instances be used to provide airplane indication as well as ground indication. The former may be accomplished by providing an airborne receiver similar to the ground receiver with the omission of the oscilloscope channel. This is shown in Fig. 3 which is similar to Fig. 1 except for synchronization. A synchronizing pulse to keep the airborne receiver switching step with the ground switching squipment is provided. Thus in position E of the transmitter switching unit, a keying pulse is applied to the modulator unit 18 as well as a control pulse over line 40. The contact at E may be shaped so that the pulse from modulator 13 is distinguishable from the other pulses by a given characteristic as for example a different pulse width or by being a double pulse, etc. This synchronizing pulse then energizes a synchronizing antenna 46 of the transmitter antenna system.

This synchronizing pulse is received by antenna 21, Fig. 4, and applied over line 42 to the synchronizing unit 43 which selects only pulses of said given characteristic and operates to control the synchronization of the aircraft switch driving means 41 with that of the ground transmitter. Receiver 22 is preferably biased to a higher cut off level so that it will respond only to directly transmitted pulses and not to reflected pulses which are weaker. Because of this bias action blocking off the receiver on the craft is also unnecessary. In other respects the aircraft receiver operates similarly to the ground station receiver previously described.

While I have described above the principles of my invention in connection with specific apparatus and particular modification thereof it is to be clearly understood that this description is made only by way of example and not as a limitation on the scope of my invention.

We claim:

1. In a radio navigation system for guiding a craft along a prescribed course comprising directive radiant acting means mounted on opposite sides of said course, a source of energy, switching means for coupling said source to said radiant acting means for sequentially energizing said radiant acting means, switching means for each of said radiant acting means for providing overlapping radiation patterns on opposite sides of said course and extending along said course, a synchronizing radiant acting means coupled to said source intermediate the sequential switching, for transmitting synchronizing signals of different distinctive characteristics from the signals in said radiation patterns.

2. A system according to claim 1, further comprising a receiver means for receiving said synchronizing signals and energy from each of said radiation patterns, separate means for providing control energies resultant from each of the overlapping radiation patterns, switching means synchronized by said synchronizing signals for successively coupling said separate means to said receiver, and means responsive to said control energies for providing a course position indication.

3. A radio navigation system for guiding a craft along a prescribed course comprising radiant acting means mounted on opposite sides of said course, a source of energy, means for energizing said radiant acting means with energy from said source for transmitting sequentially a plurality of differently directed radiation patterns along said course, means for receiving the energies of each of said radiation patterns after reradiation from said craft, means for comparing the intensity of said received energies for obtaining the course position of said craft, said means for energizing said radiant acting means comprises means for energizing the radiant acting means on one side of said course for transmitting first and second distinct directive radiation pattern along said course, and means for energizing the radiant acting means on the other side of said course for transmitting a third and fourth distinctive radiation pattern along said course, said radiation patterns transmitted from each side of said course being identical and transmitted successively at given time intervals, said means for comparing comprises means for comparing the received energies of said first and second patterns to obtain a first output, means for comparing the received energies of said third and fourth patterns to obtain a second output, and means for comparing the energy of said first and second outputs to obtain the course position of said craft.

4. An arrangement as set forth in claim 3, wherein said first and second outputs comprise separate differential outputs of the respective received energies.

5. A radio navigation system for guiding a craft along a prescribed course comprising radiant acting means mounted on opposite sides of said course, a source of energy, means for energizing the radiant acting means on one side of said course for transmitting first and second distinct directive radiation patterns along said course, means for energizing the radiant acting means on the other side of said course for transmitting third and fourth distinctive radiation patterns along said course, said radiation patterns transmitted from each side of said course being identical and transmitted successively at given time intervals, means for successively receiving the energies of said radiation patterns reradiated from said craft, means for comparing the received energy of said first and second patterns to obtain a first output, means for comparing the received energies of said third and fourth patterns to obtain a second output, said first and second outputs comprising separate ratios of the respective received energies, and means for comparing the energy of said ratios to obtain the course position of said craft.

6. An arrangement according to claim 3, further comprising means for transmitting a synchronizing signal from a position adjacent said course, means for receiving said synchronizing signal on said craft, and means for employing said synchronizing signal to control the time of comparing of the various craft received pattern energies.

7. An arrangement according to claim 6, further comprising a cathode ray oscillograph, means for delaying selected ones of said received pattern energies whereby the received pattern energies transmitted from the same side of said course are simultaneously applied to the deflection means of said oscillograph for providing the course indication of said craft.

8. An arrangement according to claim 7, wherein said radiant acting means on each side of said course each comprise two loop aerials spaced apart in a horizontal plane substantially a quarter wavelength at the system operating frequency, the aerials on each side of said course being simultaneously and alternately energized with energy of a given phase and energy phased displaced 90° with respect to said given phase.

CHESTER B. WATTS, Jr.
GUS STAVIS.

REFERENCES CITED

The following references are of record in the file of this patent:

UNITED STATES PATENTS

| Number | Name | Date |
|---|---|---|
| 2,216,707 | George | Oct. 1, 1940 |
| 2,226,860 | Grieg | Dec. 31, 1940 |
| 2,288,196 | Kramar | June 30, 1942 |
| 2,400,641 | Hardy | May 21, 1946 |
| 2,424,984 | Hoffman | Aug. 5, 1947 |
| 2,426,218 | Hopgood | Aug. 26, 1947 |
| 2,429,630 | Kandoian | Oct. 28, 1947 |
| 2,433,381 | Marchand | Dec. 30, 1947 |
| 2,435,988 | Varian | Feb. 17, 1948 |

FOREIGN PATENTS

| Number | Country | Date |
|---|---|---|
| 20,264 | Australia | Dec. 5, 1935 |
| 795,455 | France | Mar. 14, 1936 |